No. 770,280. Patented September 20, 1904.

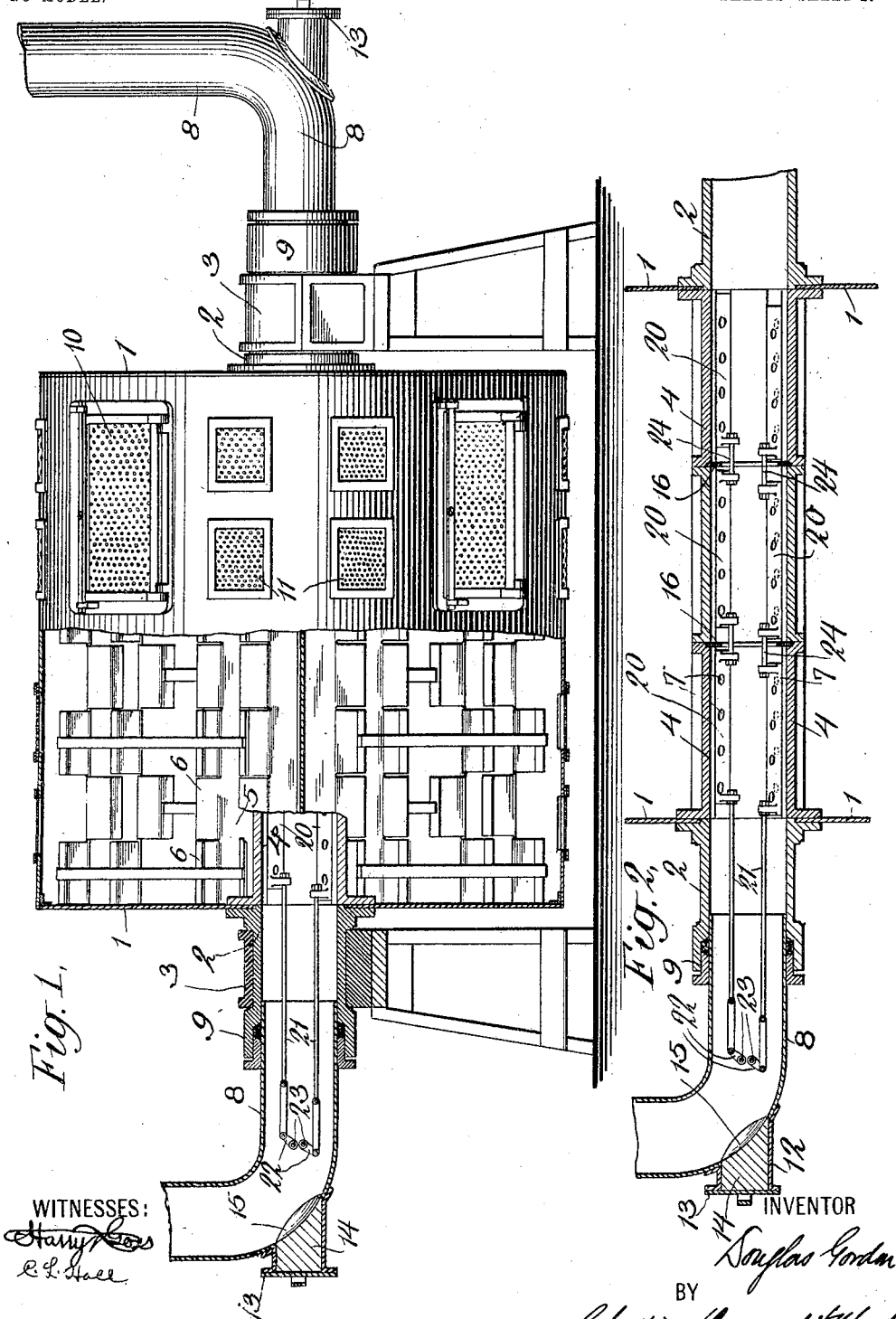

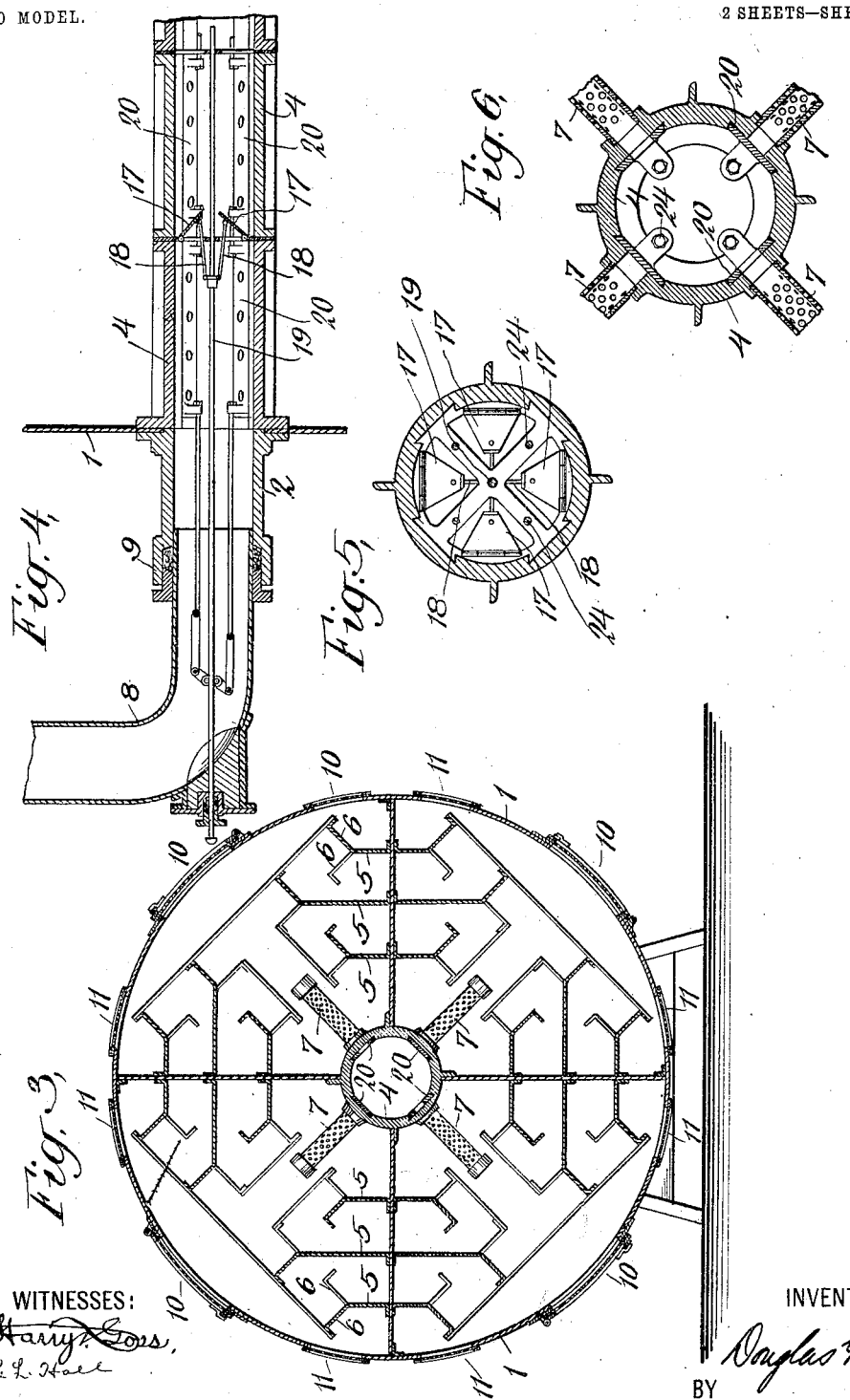

UNITED STATES PATENT OFFICE.

DOUGLAS GORDON, OF WORCESTER, MASSACHUSETTS, ASSIGNOR TO MARCUS MASON & COMPANY, OF NEW YORK, N. Y., A CORPORATION OF NEW YORK.

COFFEE-DRIER.

SPECIFICATION forming part of Letters Patent No. 770,280, dated September 20, 1904.

Application filed December 17, 1903. Serial No. 185,472. (No model.)

*To all whom it may concern:*

Be it known that I, DOUGLAS GORDON, a subject of the King of Great Britain, residing at Worcester, in the county of Worcester and State of Massachusetts, have invented certain new and useful Improvements in Coffee-Driers, of which the following is a specification, reference being had to the accompanying drawings, forming a part thereof.

My invention relates to apparatus for drying grains, berries, and the like, and particularly to coffee-driers.

My invention consists in features hereinafter described, and particularly pointed out in the claims.

The objects of my invention are to improve the construction of driers of the class described; to avoid pockets in pipes conveying hot air to the drier, in which pockets dust may gather; to distribute heat more uniformly through the drier, and to permit the use of part only of the drier when desired.

I will now proceed to describe my invention with reference to the accompanying drawings, in which one form of my improved drier is illustrated, and will then point out the novel features in claims.

In the drawings, Figure 1 shows a side elevation and partial longitudinal section of the drier. Fig. 2 shows a vertical section of the central air-conduit of the drier and means for preventing the collection of dust in the cleaning-pocket of said conduit. Fig. 3 shows a transverse section of the drier. Fig. 4 shows a longitudinal section of the central air-conduit and illustrates the use therein of an adjustable valve regulating the flow of air thereto. Fig. 5 is a transverse sectional view of this air-conduit, showing a face view of said valve. Fig. 6 is another transverse section of the air-conduit, showing the valves for cutting out one or more compartments of the drier when desired.

My improved drier illustrated in the drawings comprises a drum 1, usually formed of boiler-plate or similar sheet metal, mounted by means of hollow journals or trunnions 2 in bearings 3 and arranged to rotate in any suitable way. Within the drum and forming substantially a continuation of the said hollow trunnions is a central air-conduit 4. Between this conduit and the outer periphery of the drum are a plurality of longitudinal tumbling-plates 5, arranged in such number of series as desired and supported and braced in any suitable manner. These tumbling-plates are preferably so arranged as to permit the material being dried to fall from one to the other as the drum rotates, thus keeping the material well stirred and subjecting it uniformly to the action of the air. Preferably, also, these tumbling-plates are so constructed as to prevent the material dried from collecting in masses. In the construction shown each of the tumbling-plates is provided with leaves 6, projecting alternately in opposite directions and having flanged ends, this construction being efficient to prevent collection of the berries in masses. The interior of the drum is divided by the supports of the tumbling-plates into four longitudinal compartments, though of course there may be a smaller or a greater number, if desired, and each compartment is provided at suitable intervals with perforated pipes 7, branching from the conduit 4, which serve to distribute through the drum the air escaping from the conduit 4. Air is supplied to this interior conduit 4 by means of suitable pipes 8, connected to the hollow trunnions 2 by means of stuffing-boxes 9, and preferably the air which enters through these pipes 8 is first dried and heated by any suitable well-known means.

The drum 1 is provided at suitable intervals with charging-doors 10 and also with escape-openings 11. These doors and the escape-openings 11 are provided with wire screens of suitable mesh to permit the escape of the air, but prevent the escape of the berries or other material treated.

In order to withdraw the dust which accumulates in the air-conduit 4, the air-pipes are provided at their ends or elbows with chambers or pockets 12, projecting in the axial line of the air-conduit and closed by end caps 13. In order to prevent the collection of dust in these pockets, which is to be avoided, I preferably fill the same with a filling-piece 14, of wood or other suitable material, the inner face 15 of these filling-pieces forming a continuation of the surface of the elbows. The pockets 12 being completely closed, no opportunity is afforded for the collection of dust therein. The employment of these filling-pieces also affords a smooth interior surface for correctly directing the currents of air and prevents eddies from forming at these points, as will form where the surface is broken.

The air entering the conduit 4 tends to escape to a greater extent in the central portion of the drum than near the ends thereof. To remedy this and distribute the air more uniformly through the drum, I provide in the said air-conduit suitable throttling-rings 16, which because the diameter of their central holes is less than the internal diameter of the air-conduit cause a greater portion of the air to pass out through the openings in the conduit near the ends of the drum than would otherwise be the case. Such number of these throttling-rings may be used as is desired. By means of them the distribution of air through the drum may be made substantially uniform.

Instead of using mere throttling-rings, as shown in Fig. 2, I may use valves such as shown in Figs. 4 and 5, consisting of hinged flaps 17, connected by means of links 18 to a longitudinal rod 19, projecting from the elbow of one of the air-pipes. By means of this rod 19 the opening of the valves may be regulated.

In order to permit the use of one or more of the longitudinal compartments of the drier without the others, I further provide valves 20, corresponding in number to the number of compartments, for opening or closing at will the mouths of the perforated branch pipes 7. Such valves in the form shown are plates mounted to slide longitudinally in grooves or guides formed in the conduit 4 and provided with openings corresponding to the mouths of pipes 7 and arranged to open or close the same, according to the positions of the valves. Said valves may be operated in any suitable manner and are here shown as arranged to be operated by rods 21, connected to arms 22 of operating-stems 23, projecting through the walls of elbow 8. In Fig. 2 one of the valves 20 is shown in the open position and the other in the closed position.

In the drawings the air-conduit 4 is shown as composed of a plurality of sections bolted together longitudinally, and the valves 20 are therefore composed of a similar number of sections connected together by bolts 24.

In the operation of this drying apparatus the coffee or other material to be dried is charged into the drum through the charging-doors 10, which are then closed, and the drum rotated. Air heated to a suitable degree is forced into the drum through the pipes 8 and passes out through the branches 7 and perforations therein into the interior of the drum and then passing through the constantly-moving mass of coffee within said drum escapes through the screened escape-openings 11 and 10.

What I claim is—

1. In a drier, the combination with a drying-drum provided with an internal air-conduit, and means for supplying air thereto, comprising a pipe having an elbow connecting it to said conduit, said elbow provided with a cleaning-pocket in line with said conduit, of a filling-piece normally filling and closing the said cleaning-pocket, the inner face of which forms a continuation of the inner surface of the said elbow.

2. In a drier, the combination with a drying-drum provided with an internal air-conduit having suitable escape-openings, of a flat valve within said conduit comprising hinged flaps, and means for separating or drawing the same together at will, thereby regulating the distribution of air through the drum.

3. In a drier, the combination with a drying-drum having an internal air-conduit, and means for supplying air thereto comprising a pipe having an elbow connecting it with said conduit, said conduit provided with suitable escape-openings, of a flat valve within said conduit for regulating the distribution of air, said valve comprising hinged flaps and means for separating or drawing the same together, and an operating-rod for said valve projecting through an orifice in said elbow.

4. In a drier, the combination with a drying-drum having an internal air-conduit, and means for supplying air thereto comprising a pipe having an elbow connecting it with said conduit, said elbow provided with a cleaning-pocket in line with the conduit, and said conduit having suitable escape-openings, of a valve within said conduit for regulating the distribution of air, an operating-rod therefor projecting through the cleaning-pocket, and a filling-piece in said conduit, through an aperture in which said rod passes, the inner surface of such filling-piece forming a continuation of the inner surface of the elbow.

5. In a drier, the combination with a drying-drum having a plurality of compartments and an internal air-conduit arranged to deliver air thereto, of means for closing communication between one or more of said compartments and the conduit at will.

6. In a drier, the combination with a drying-drum having a plurality of compartments and an internal air-conduit arranged to deliver air thereto, of sliding valves, mounted upon said conduit and arranged to close communication between one or more of said compartments and the conduit at will.

7. In a drier, the combination with a drying-drum having a plurality of compartments and an internal air-conduit arranged to deliver air thereto and formed in a plurality of longitudinal sections, of valves for closing communication between one or more of said compartments and the conduit, at will, mounted upon said conduit and divided into sections corresponding to the sections of the conduit.

In witness whereof I have hereunto set my hand this 12th day of December, 1903.

DOUGLAS GORDON.

Witnesses:
 J. C. DEWEY,
 M. HAAS.